(12) United States Patent
Chang

(10) Patent No.: US 6,600,562 B1
(45) Date of Patent: Jul. 29, 2003

(54) METHOD OF EXTENDED COLOR SENSE AND ESTIMATION FOR RGB LED ILLUMINANTS

(75) Inventor: Chin Chang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 42 days.

(21) Appl. No.: 10/043,526

(22) Filed: Jan. 11, 2002

(51) Int. Cl.[7] .................................................. G01J 3/51
(52) U.S. Cl. ....................... 356/405; 356/419
(58) Field of Search ................................. 356/405, 406, 356/416, 419

(56) References Cited

U.S. PATENT DOCUMENTS

| | | |
|---|---|---|
| 5,596,428 A | 1/1997 | Tytgat et al. |
| 5,734,368 A | 3/1998 | Meyers et al. |
| 6,507,159 B2 * | 1/2003 | Muthu ........................ 315/307 |

FOREIGN PATENT DOCUMENTS

WO   WO 01/84901 A1 * 11/2001 .................. 356/405

OTHER PUBLICATIONS

An article entitled "Digital Color Reproduction," OSA Handbook: The Science of Color, $2^{nd}$ Edition 1.0, (Authors Brian Wandell and Louis D. Silverstein, Dec. 14, 2000, pp. 1–54).

An article entitled "Water into Wine: Converting Scanner RGB to Tristimulus XYZ," (Authors Brian A. Wandell and J. E. Farrell, Apr. 13, 1994, pp. 1–11).

* cited by examiner

Primary Examiner—F. L. Evans

(57) ABSTRACT

The invention provides a method of determining tristimulus values for light emitting diode illuminants. A localized transformation matrix is determined based on a set of spectral responsivity data and a set of color-matching functions. A set of color responses associated with light emitted from the light emitting diode illuminants may be measured, and an estimate of tristimulus values based on the localized transformation matrix and the set of color responses may be determined.

20 Claims, 5 Drawing Sheets

METHOD OF EXTENDED COLOR SENSE AND ESTIMATION FOR RGB LED ILLUMINANTS

FIELD OF THE INVENTION

This invention relates generally to the characterization of light emitting diodes, and specifically to a method of color sense and estimation for a red-green-blue triad of LED illuminants.

BACKGROUND OF THE INVENTION

As low-cost, energy-efficient, solid-state light emitting diodes (LEDs) become increasingly available, particularly with recent improvements in the availability of low-cost blue LEDs, the use of LED arrays for illumination purposes is becoming more prominent. With the use of LEDs as illuminants comes the need to control the mixing of the substituent colors in order to attain and sustain a particular or desired type of color. As is well known, a triad of nominally red, green and blue light sources may be additively combined to give the perception of nearly any desired hue, saturation and luminosity, including an achromatic white light. A triad of nominally red, green and blue LEDs may be used to generate the desired color and intensity by varying the amount of current applied to each of the three LEDs. The resulting color then may be measured, and these measurements may be used to regenerate the color at a later time, or used in a system to maintain the desired color point. Applications for LED illuminants may include backlit displays for personal digital assistants and hand-held gaming devices, and backlighting for portable communication equipment, LED flashlights, indoor lighting, outdoor lighting and road lighting.

Traditional methods of color measurement may use expensive equipment such as spectrophotometers, spectrocolorimeters, calorimeters, spectroradiometers, or radiometric colorimeters. A spectrophotometer may measure the reflection or transmission characteristics of a sample at different wavelengths over the desired band. A calorimeter may provide tristimulus values or the coordinates in a uniform color space, such as L*a*b* chromaticity coordinates, using several broad response filters to modify the light source of the instrument in an attempt to duplicate a CIE illuminant and standard observer combination. A spectroradiometer may provide a spectral power distribution over the desired band, while a radiometric colorimeter may provide tristimulus values or chromaticity coordinates for light emitting from a radiant source, such as a hot filament, a solid-state laser or an LED illuminant. Information on color measurement techniques, and many other aspects of color science, may be found in the text entitled *Color for Science, Art and Technology,* edited by K. Nassua, Amsterdam, The Netherlands: Elsevier Science B. V., 1998.

These methods of color measurement, although accurate and traceable, are relatively expensive, time consuming, and require specialized test setups. Many applications need a simple yet accurate method of color sensing, using a compact structure that can be used for measuring the color of LED illuminants. Ideally, a rapid method and a compact structure may be contained in the same package as the LED illuminants to provide continuous monitoring, color setting, and color correction.

Many standards are available for use in the determination and measurement of color. Chromaticity coordinates x, y may be defined in a color space, as described by the CIE 1931 Standard Observer recommendations. The 1976 CIE L*a*b* system provides color coordinates along a green-red axis, a yellow-blue axis and a luminosity axis. An alternative color system, the 1976 CIE L*u*v* system, is used often for assessing radiant sources. CIE standards are published by the Commission Internationale de I'Eclairage (CIE), CIE Central Bureau, Kegelgasse 27 A-1030, Wein, Austria. Other standards are prominently used in industrial and commercial applications, such as those by the American Standards for Testing and Materials (ASTM), 100 Bar Harbor Drive, West Conshohocken, Pa. 19428, including publications ASTM 0001 through ASTM 0036.

Color tristimulus values X, Y and Z express the perception of color in accordance with a standard observer. The X, Y and Z tristimulus values are numerals physically representing the integral over a specified range of wavelengths of light reflected from a sample and the spectral power distribution of the illuminant measured at a particular wavelength, modified by the CIE 1931 Standard Observer color functions. When the tristimulus values are known, the color points may be obtained in other color coordinate systems including CIE x, y chromaticity coordinates, CIE L*a*b*, CIE L*u*v* or other color spaces that use various linear and nonlinear transformations.

Further transformations and corrections may be made to accurately record, display and reproduce color for copy machines, scanners, color TVs and monitors, printers, and digital cameras. An example of transformations used for image processing in digital cameras or color scanners may be found in "Method of Processing an Image Signal" (U.S. Pat. No. 6,278,533). Colorimetric systems are described in "Colorimetric System Having Function of Selecting Optimum Filter From a Plurality of Optical Bandpass Filters" (U.S. Pat. No. 5,986,767), "Colorimetric Imaging System for Measuring Color and Appearance" (U.S. Pat. No. 5,850,472) and "Colorimeter" (U.S. Pat. No. 4,402,611).

Accurate determination of color tristimulus values in a compact system may benefit from the careful selection of color filters and associated detectors. In general, it is difficult to manufacture and find a set of color filters that match the human color-matching functions. A method of accurately and rapidly transforming the filter outputs may require transformation matrices that minimize the amount of calculations while providing additional terms and additional responses for cases where more accuracy is desired. A general guideline for photodetector and color filter selection to improve color-sensing accuracy for a specific set of illuminants also would be beneficial.

The object of this invention, therefore, is to provide a method and a system for color sensing and estimation of LED illuminants, and to overcome the deficiencies and obstacles described above.

SUMMARY OF THE INVENTION

One aspect of the invention is a method for determining tristimulus values for light emitting diode illuminants. The method may include the steps of determining a localized transformation matrix based on a set of spectral sensitivity functions and a set of color-matching functions, measuring a set of color responses associated with light emitted from the light emitting diode illuminants, and determining an estimate of tristimulus values based on the localized transformation matrix and the set of color responses.

The light emitting diode illuminants may include one or more red, green and blue light emitting diode triads. The localized transformation matrix may be computed using a Taylor's series expansion at a peak red wavelength, a peak green wavelength, and a peak blue wavelength associated with the red, green and blue light emitting diode triad.

The color responses may be measured with a red color filter, a green color filter and a blue color filter. The localized transformation matrix may include matrix elements associated with the color responses from the red, green and blue color filters. The color responses may be measured with red, green and blue color filters, and red, green and blue edge filters. The localized transformation matrix may include elements associated with the color responses from the red, green and blue color filters, and the red, green and blue edge filters. The color responses may be measured with red, green and blue color filters, red, green and blue edge filters, and red, green and blue band-stop filters. The localized transformation matrix may include elements associated with the color responses from the red, green and blue color filters, the red, green and blue edge filters, and the red, green and blue band-stop filters.

The method for determining tristimulus values for light emitting diode illuminants may further include the step of calculating a set of color point values from the estimated tristimulus values. The method for determining tristimulus values for light emitting diode illuminants may further include the step of calculating a set of chromaticity coordinates from the estimated tristimulus values in a device-independent color coordinate system, a pre-defined color coordinate system, or a user-defined color coordinate system.

Another aspect of the current invention is a light emitting diode illuminant tristimulus value generation system including a means for determining a localized transformation matrix based on a set of spectral sensitivity functions and a set of color-matching functions, a means for measuring a set of color responses associated with light emitted from the light emitting diode illuminants, and a means for determining an estimate of tristimulus values based on the localized transformation matrix and the set of color responses.

The system may include a means for calculating a set of color point values from the estimated tristimulus values. The system may include a means for calculating a set of chromaticity coordinates from the estimated tristimulus values in a device-independent color coordinate system, a pre-defined color coordinate system, and a user-defined color coordinate system.

Another aspect of the current invention is a computer usable medium including a program for determining tristimulus values of light emitting diode illuminants including computer program code to determine a localized transformation matrix based on a set of spectral sensitivity functions and a set of color-matching functions, computer program code to measure a set of color responses associated with light emitted from the light emitting diode illuminants, and computer program code to determine an estimate of tristimulus values based on the localized transformation matrix and the set of color responses.

The localized transformation matrix may include matrix elements associated with the color responses from a set of red, green and blue color filters. The localized transformation matrix may include matrix elements associated with the color responses from a set of red, green and blue color filters, and a set of red, green and blue edge filters. The localized transformation matrix may include matrix elements associated with the color responses from a set of red, green and blue color filters, a set of red, green and blue edge filters, and a set of red, green and blue band-stop filters.

The computer usable medium may include computer program code to calculate a set of color point values from the estimated tristimulus values. The computer usable medium may include computer program code to calculate a set of chromaticity coordinates in a device-independent color coordinate system, a pre-defined color coordinate system, and a user-defined color coordinate system.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
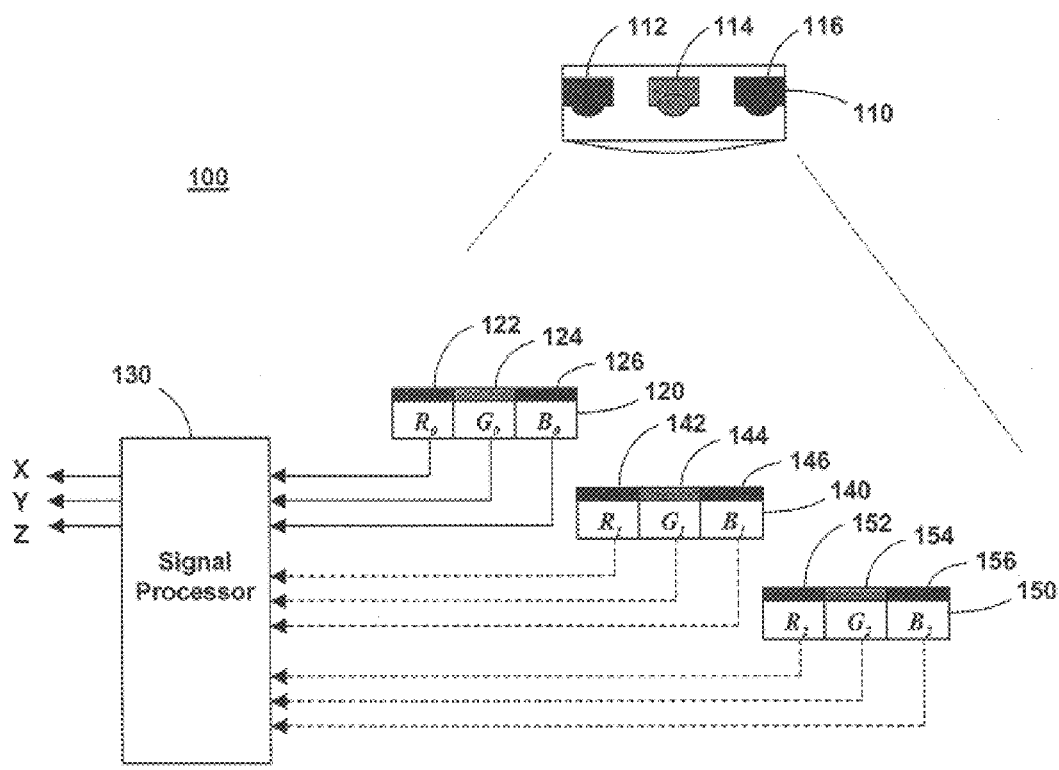
FIG. 1 is a block diagram of one embodiment of a system for generating an estimate of tristimulus values for light emitting diode illuminants, in accordance with the current invention.

FIG. 1 shows a block diagram of a system for generating an estimate of tristimulus values for light emitting diode illuminants, in accordance with the present invention at 100.

The light emitting diode illuminant tristimulus value generation system may include one or more LED luminaries 110, a color filter and photodetector array 120, and a signal processor 130. The light emitting diode illuminant tristimulus value generation system may include an optional edge filter and photodetector array 140, and an optional band-stop filter and photodetector array 150.

LED illuminary 110 may emit light when electrical current is supplied to it. LED illuminary 110 may be comprised of one or more nominally red light emitting diodes 112, one or more nominally green light emitting diodes 114, and one or more nominally blue light emitting diodes 116. LED illuminary 110 may be comprised of an LED triad including a red LED, a green LED, and a blue LED. LED illuminary 110 may be comprised of many LED triads. Emitted light from LED illuminary 110 may be measured by color filter and photodetector array 120.

Color filter and photodetector array 120 may contain a set of photodetectors, each with a selected color filter in front of it. Photodetector and color filter 122 may include a nominally red filter, with any suitable photodetector such as a silicon photodetector capable of providing an output signal $R_0$ in response to the amount of red light emitted from LED illuminary 110. Photodetector and color filter 124 may include a nominally green filter, providing an output signal $G_0$ in response to the amount of green light emitted from LED illuminary 110. Photodetector and color filter 126 may include a nominally blue filter, providing an output signal $B_0$ in response to the amount of light emitted from LED illuminary 110.

Signal processor 130 may contain any suitable hardware and software for receiving response signals from the photodetector arrays, and computing a set of estimated tristimulus values. Signal processor 130 may also contain suitable hardware and software for generating color point values from the estimated tristimulus values, or for-calculating a set of chromaticity coordinates from the estimated tristimulus values in a device-independent color coordinate system, a pre-defined coordinate system, or a user-defined color coordinate system.

An optional edge filter and photodetector array 140 may provide response signals $R_1$, $G_1$ and $B_1$, which may be used to generate tristimulus values with more accuracy. Photodetector and edge filter 142 may include an edge filter that transmits nominally red light, and absorbs nominally green and blue light. The edge filter may be selected such that the transition wavelength between the transmitting and absorbing regions corresponds to the peak wavelength of the red LED, or another primary dominant wavelength. Photodetector and edge filter 144 may include an edge filter that transmits nominally red and green light, and absorbs nominally blue light. The edge filter may be selected such that the transition wavelength between the transmitting and absorbing regions corresponds to the peak wavelength of the green LED, or another primary dominant wavelength. Photodetector and edge filter 146 may include an edge filter that transmits nominally red, green and a portion of the blue light. The edge filter may be selected such that the transition wavelength between the transmitting and absorbing regions corresponds to the peak wavelength of the blue LED, or another primary dominant wavelength.

An optional band-stop filter and photodetector array 150 may provide response signals $R_2$, $G_2$ and $B_2$, which may be used to generate tristimulus values with even more accuracy. Photodetector and band-stop filter 152 may include a band-stop filter that absorbs nominally red light, and transmits nominally green and blue light. The band-stop filter may be selected such that the center wavelength of the absorption region corresponds to the peak wavelength of the red LED, or another primary dominant wavelength. Photodetector and band-stop filter 154 may include a band-stop filter that absorbs nominally green light, and transmits nominally red and blue light. The band-stop filter may be selected such that the center wavelength of the absorption region corresponds to the peak wavelength of the green LED, or another primary dominant wavelength. Photodetector and band-stop filter 156 may include an edge filter that absorbs nominally blue light, and transmits nominally red and green light. The band-stop filter may be selected such that the center wavelength of the absorption region corresponds to the peak wavelength of the blue LED, or another primary dominant wavelength.

Figure 2:
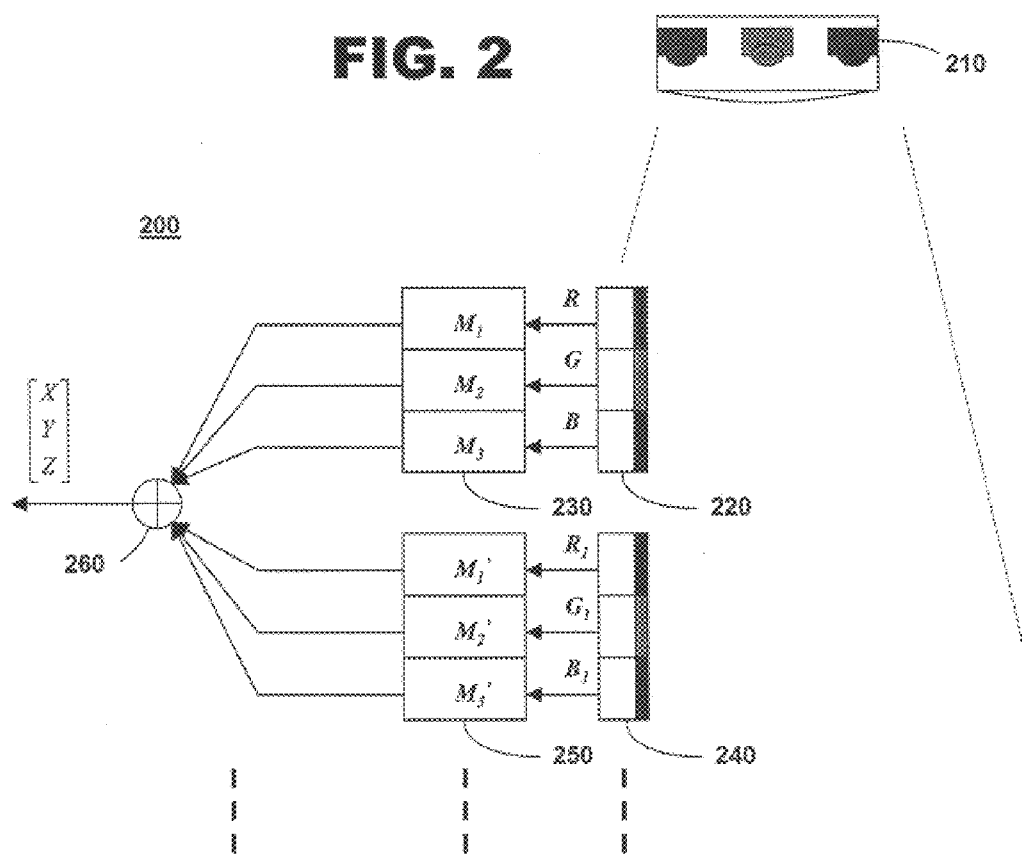
FIG. 2 is an illustration of one embodiment of a method for determining tristimulus values for light emitting diode illuminants, in accordance with the current invention.

FIG. 2 shows an illustration of a method for determining tristimulus values for light emitting diode illuminants, in accordance with the present invention at 200.

Tristimulus value determination method 200 may generate an estimate of the tristimulus values corresponding to light emitted from one or more LED illuminaries 210. A portion of the light emitted from LED illuminary 210 may be detected by photodetector and color filters 220. The set of color responses $R_0$, $G_0$, and $B_0$ from photodetector and color filters 220 associated with light emitted from LED illuminary 210 may be algebraically operated on by a localized transformation matrix M 230. Localized transformation matrix M 230 may contain column vectors $M_1(\lambda_1)$, $M_2(\lambda_2)$, and $M_3(\lambda_3)$, where the set of color responses $R_0$, $G_0$ and $B_0$ are multiplied by matrix M according to standard matrix operations to determine an estimate of tristimulus values X, Y and Z according to the formula:

$$\begin{bmatrix} X \\ Y \\ Z \end{bmatrix} = [\, M_1(\lambda_1) \quad M_2(\lambda_2) \quad M_3(\lambda_3) \,] \begin{bmatrix} R_0 \\ G_0 \\ B_0 \end{bmatrix} \quad (1)$$

Column vector $M_1(\lambda_1)$ may contain three pre-computed elements $m_{11}$, $m_{21}$ and $m_{31}$. Elements $m_{11}(\lambda_1)$, $m_{21}(\lambda_1)$ and $m_{31}(\lambda_1)$ may be computed at a primary dominant wavelength, at the peak wavelength of the red LED, or at another suitable wavelength. Column vector $M_2(\lambda_2)$ may contain three pre-computed elements $m_{12}$, $m_{22}$ and $m_{32}$. Elements $m_{12}(\lambda_2)$, $m_{22}(\lambda_2)$ and $m_{32}(\lambda_2)$ may be computed at a primary dominant wavelength, at the peak wavelength of the green LED, or at another suitable wavelength. Column vector $M_3(\lambda_3)$ may contain three pre-computed elements $m_{13}$, $m_{23}$ and $m_{33}$. Elements $m_{13}(\lambda_3)$, $m_{23}(\lambda_3)$ and $m_{33}(\lambda_3)$ may be computed at a primary dominant wavelength, at the peak wavelength of the blue LED, or at another suitable wavelength.

Tristimulus values X, Y and Z may be determined with more accuracy by including additional terms in the calculation at summing junction 260. Utilizing color filter responses $R_0$, $G_0$ and $B_0$ from the set of nominally red, green and blue photodetector and color filters 220, and edge filter responses $R_1$, $G_1$ and $B_1$ from a set of red, green and blue photodetector and edge filters 240 corresponding to a set of primary dominant wavelengths, a set of peak wavelengths of the red, green and blue LEDs in the LED illuminary, or a set of suitable wavelengths, the tristimulus values may be determined in accordance with the equation:

$$\begin{bmatrix} X \\ Y \\ Z \end{bmatrix} = [\, M_1(\lambda_1) \quad M_2(\lambda_2) \quad M_3(\lambda_3) \,] \begin{bmatrix} R_0 \\ G_0 \\ B_0 \end{bmatrix} + \quad (2)$$

$$[\, M_1'(\lambda_1) \quad M_2'(\lambda_2) \quad M_3'(\lambda_3) \,] \begin{bmatrix} R_1 \\ G_1 \\ B_1 \end{bmatrix}$$

where $M_1'(\lambda_1)$, $M_2'(\lambda_2)$ and $M_3'(\lambda_3)$ may be comprised of 1×3 column vectors that form localized transformation matrix 250. Column vector $M_1'(\lambda_1)$ may contain three pre-computed elements $m_{11}'$, $m_{21}'$ and $m_{31}'$. Elements $m_{11}'(\lambda_1)$, $m_{21}'(\lambda_1)$ and $m_{31}'(\lambda_1)$ may be computed at a primary dominant wavelength, at the peak wavelength of the red LED, or at another suitable wavelength. Column vector $M_2'(\lambda_2)$ may contain three pre-computed elements $m_{12}'$, $m_{22}'$ and $m_{32}'$. Elements $m_{12}'(\lambda_2)$, $m_{22}'(\lambda_2)$ and $m_{32}'$ may be computed at a primary dominant wavelength, at the peak wavelength of the green LED, or at another suitable wavelength. Column vector $M_3'(\lambda_3)$ may contain three pre-computed elements $m_{13}'$, $m_{23}'$ and $m_{33}'$. Elements $m_{13}'(\lambda_3)$, $m_{23}'(\lambda_3)$ and $m_{33}'(\lambda_3)$ may be computed at a primary dominant wavelength, at the peak wavelength of the blue LED, or at another suitable wavelength. The results of localized transformation matrix M 230 operating on responses from photodetector and color filters 220 and localized transformation matrix 250 operating on responses from photodetector and edge filters 240 may be added at summing junction 260 to produce the tristimulus values X, Y and Z.

Figure 3:
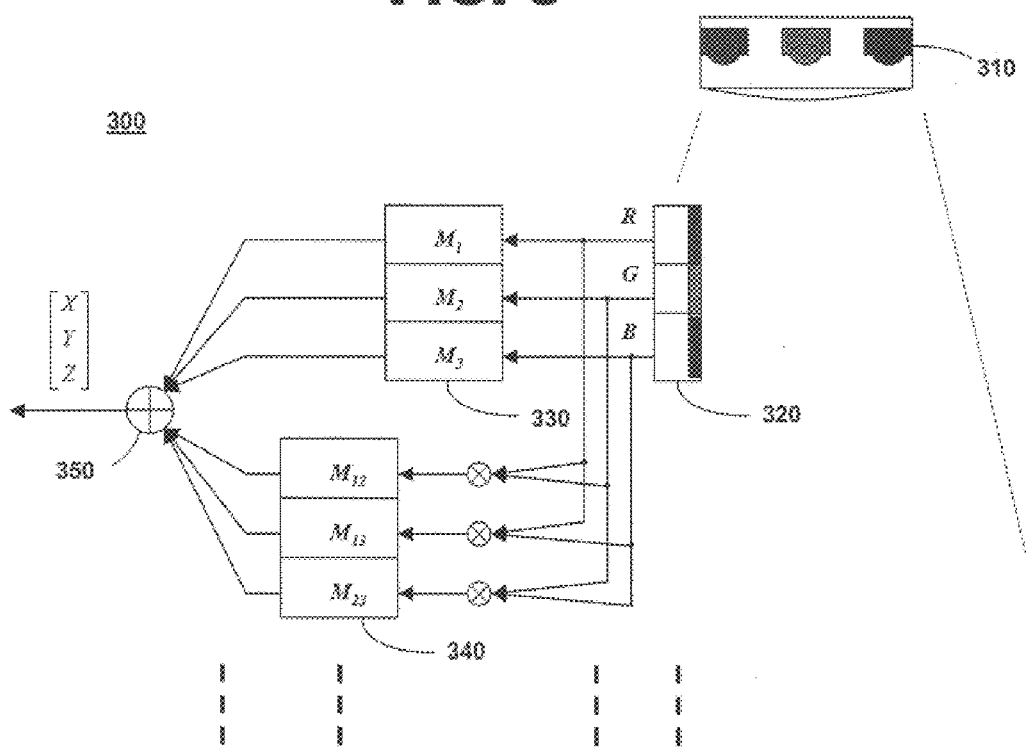
FIG. 3 is an illustration of another embodiment of a method for determining tristimulus values for light emitting diode illuminants, in accordance with the current invention.

FIG. 3 shows an illustration of another method for determining tristimulus values for light emitting diode illuminants, in accordance with the present invention at 300.

Further accuracy in the determination of tristimulus values X, Y and Z for an LED illuminary 310 may be obtained using cross terms and higher order terms. For example, the tristimulus values may be obtained according to the formula:

$$\begin{bmatrix} X \\ Y \\ Z \end{bmatrix} = [M_1 \ M_2 \ M_3 \ M_{12} \ M_{13} \ M_{23}] \begin{bmatrix} R_0 \\ G_0 \\ B_0 \\ R_0 G_0 \\ R_0 B_0 \\ G_0 B_0 \end{bmatrix} \quad (3)$$

using the set of color responses from photodetector and color filters 320 with localized transformation matrix 330 and localized transformation matrix 340, and then adding them at summing junction 350.

Figure 4:
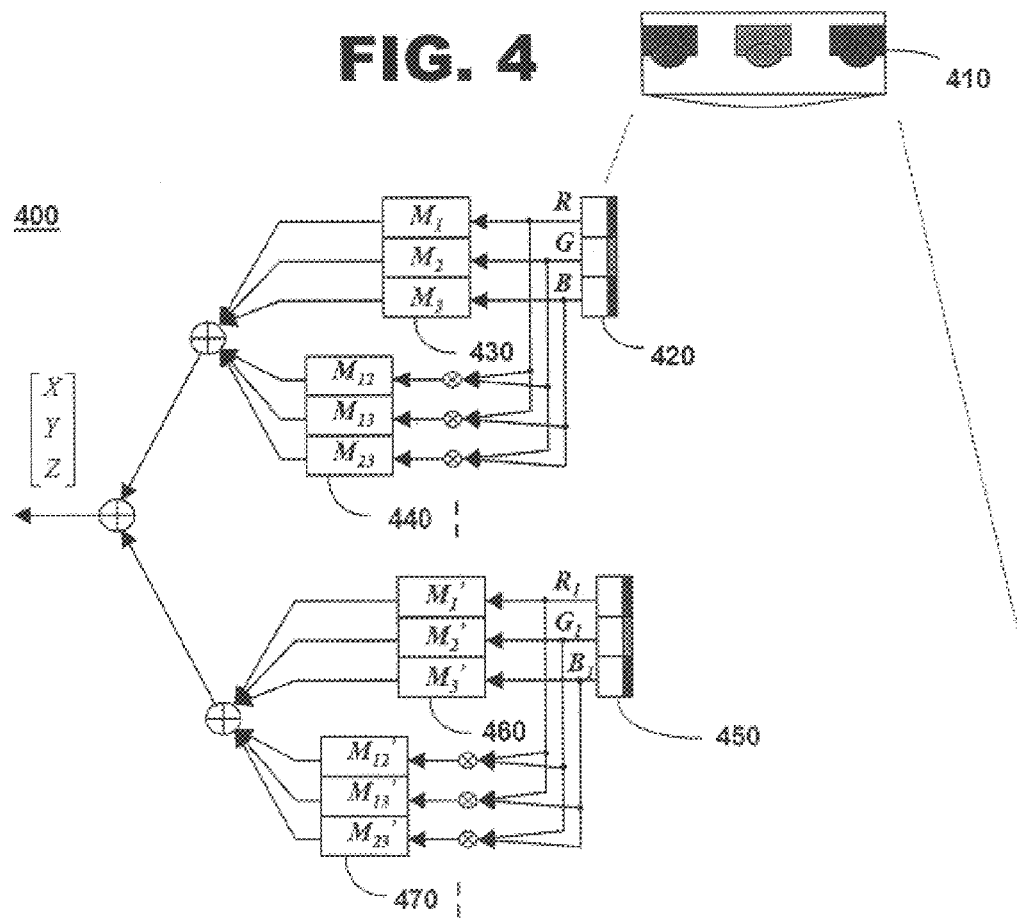
FIG. 4 is an illustration of another embodiment of a method for determining tristimulus values for light emitting diode illuminants, in accordance with the current invention.

FIG. 4 shows an illustration of another method for determining tristimulus values for light emitting diode illuminants, in accordance with the present invention at 400.

Further accuracy in the determination of tristimulus values X, Y and Z for an LED illuminary 410 may be obtained using the set of responses from photodetector and color filters 420 with localized transformation matrix 430 and localized transformation matrix 440 for cross terms, combined with the set of responses from photodetector and edge filters 450 and localized transformation matrix 460 and localized transformation matrix 470 for cross terms. When the set of responses from photodetector and edge filters 450 are incorporated, the tristimulus values may be calculated according to the formula:

$$\begin{bmatrix} X \\ Y \\ Z \end{bmatrix} = [M_1 \ M_2 \ M_3 \ M_{12} \ M_{13} \ M_{23}] \quad (4)$$

$$\begin{bmatrix} R_0 \\ G_0 \\ B_0 \\ R_0 G_0 \\ R_0 B_0 \\ G_0 B_0 \end{bmatrix} + [M'_1 \ M'_2 \ M'_3 \ M'_{12} \ M'_{13} \ M'_{23}] \begin{bmatrix} R_1 \\ G_1 \\ B_1 \\ R_1 G_1 \\ R_1 B_1 \\ G_1 B_1 \end{bmatrix}$$

Further accuracy in the calculation of tristimulus values X, Y and Z may be obtained, when desired, using the responses from band-stop filters $R_2$, $G_2$ and $B_2$. The above equations may be expanded further, as follows:

$$\begin{bmatrix} X \\ Y \\ Z \end{bmatrix} = [M_1(\lambda_1) \ M_2(\lambda_2) \ M_3(\lambda_3)] \begin{bmatrix} R_0 \\ G_0 \\ B_0 \end{bmatrix} + [M'_1(\lambda_1) \ M'_2(\lambda_2) \ M'_3(\lambda_3)] \quad (5)$$

$$\begin{bmatrix} R_1 \\ G_1 \\ B_1 \end{bmatrix} + [M''_1(\lambda_1) \ M''_2(\lambda_2) \ M''_3(\lambda_3)] \begin{bmatrix} R_2 \\ G_2 \\ B_2 \end{bmatrix}$$

where localized matrix column vectors $M_1''$, $M_2''$ and $M_3''$ may be calculated at the same set of primary dominant wavelengths, the peak wavelengths of the red, green and blue LEDs in the triad, or another set of suitable wavelengths. When additional nonlinear terms and cross terms are included, the formula may become:

$$\begin{bmatrix} X \\ Y \\ Z \end{bmatrix} = [M_1 \ M_2 \ M_3 \ M_{12} \ M_{13} \ M_{23}] \quad (6)$$

$$\begin{bmatrix} R_0 \\ G_0 \\ B_0 \\ R_0 G_0 \\ R_0 B_0 \\ G_0 B_0 \end{bmatrix} + [M'_1 \ M'_2 \ M'_3 \ M'_{12} \ M'_{13} \ M'_{23}]$$

$$\begin{bmatrix} R_1 \\ G_1 \\ B_1 \\ R_1 G_1 \\ R_1 B_1 \\ G_1 B_1 \end{bmatrix} + [M''_1 \ M''_2 \ M''_3 \ M''_{12} \ M''_{13} \ M''_{23}] \begin{bmatrix} R_2 \\ G_2 \\ B_2 \\ R_2 G_2 \\ R_2 B_2 \\ G_2 B_2 \end{bmatrix}$$

Cross terms between color and edge filters, color and band-stop filters, and edge filters and band-stop filters may also be included, along with terms of second and higher order to attain nearly any desired level of accuracy.

Up to this point, little attention has been given to the calculation of the localized transformation matrix elements. Suppose that color filter sensitivity functions of the red, green and blue color filters are $r(\lambda)$, $g(\lambda)$ and $b(\lambda)$, respectively. Usually, $r(\lambda)$, $g(\lambda)$ and $b(\lambda)$ are positive real continuous functions of $\lambda$ for values of $\lambda$ over the range of concern, for example, over the range of visible wavelengths between 380 nm and 780 nm, or $\lambda \in \sigma = [380,780]$. In general, there exists a real function matrix $M(\lambda)$, such that $$\begin{bmatrix} \bar{x}(\lambda) \\ \bar{y}(\lambda) \\ \bar{z}(\lambda) \end{bmatrix} = M(\lambda) \begin{bmatrix} r(\lambda) \\ g(\lambda) \\ b(\lambda) \end{bmatrix}, \quad (7)$$

where $M(\lambda) = \{m_{ij} \ ij=1, 2, 3\}$ are real functions, and $\bar{x}(\lambda)$, $\bar{y}(\lambda)$, and $\bar{z}(\lambda)$ are color-matching functions such as the widely used standard observer color functions established by the CIE in 1931. If it is further assumed that $$\bar{x}(\lambda) \neq 0 \text{ for } \lambda \in \{\lambda_{x,min}, \lambda_{x,max}\}; \quad (8a)$$

$$\bar{y}(\lambda) \neq 0 \text{ for } \lambda \in \{\lambda_{y,min}, \lambda_{y,max}\}; \quad (8b)$$

$$\bar{z}(\lambda) \neq 0 \text{ for } \lambda \in \{\lambda_{z,min}, \lambda_{z,max}\}; \quad (8c)$$

and $$r(\lambda) \neq 0 \text{ for } \lambda \in \{\lambda_{r,min}, \lambda_{r,max}\}; \quad (9a)$$

$$g(\lambda) \neq 0 \text{ for } \lambda \in \{\lambda_{g,min}, \lambda_{g,max}\}; \quad (9b)$$

$$b(\lambda) \neq 0 \text{ for } \lambda \in \{\lambda_{b,min}, \lambda_{b,max}\}; \quad (9c)$$

one may have the following observations related to the color sensor spectrum ranges:

1) If $\lambda_{r, min} \leq \lambda_{x, min} < \lambda_{x, max} \leq \lambda_{r, max}$, $\lambda_{g, min} \leq \lambda_{y, min} < \lambda_{y, max} \leq \lambda_{g, max}$, and $\lambda_{b, min} \leq \lambda_{z, min} < \lambda_{z, max} \leq \lambda_{b, max}$, then $M(\lambda)$ can be diagonal and is bounded.

2) If $\lambda_{b, min} \leq \lambda_{z, min} , < \lambda_{max} \leq \lambda_{r, max}$, $\lambda_{g, min} \leq \lambda_{b, max}$, and $\lambda_{r, min} \leq \lambda_{g, max}$, then $M(\lambda)$ is bounded.

3) If $\lambda_{b, max} < \lambda_{g, min}$, or $\lambda_{g, max} < \lambda_{r, min}$, or $\lambda_{r, max} < \lambda_{x, max}$, or $\lambda_{z, min} < \lambda_{b, min}$, then $M(\lambda)$ is unbounded.

4) $M(\lambda)$ is singular at $\lambda_{x, min}, \lambda_{x, max}, \lambda_{y, min}, \lambda_{y, max}, \lambda_{z, min}, \lambda_{z, max}$ If Eq. 7 denotes that $M(\lambda)=[M_1(\lambda), M_2(\lambda), M_3(\lambda)]$, the tristimulus values for the RGB LED illuminants with combined power spectral density for the LED illuminant or combined radiation spectrum $P(\lambda)$ may be expressed as:

$$\begin{bmatrix} X \\ Y \\ Z \end{bmatrix} = \int_\sigma M_1(\lambda) r(\lambda) P(\lambda) d\lambda + \int_\sigma M_2(\lambda) g(\lambda) P(\lambda) d\lambda + \int_\sigma M_3(\lambda) b(\lambda) P(\lambda) d\lambda \quad (10)$$

Depending on the location of the peak wavelength of the LED illuminants and the color filter sensitivity function peak wavelength (when there is any), a Taylor series approximation of $M_i(\lambda)$ may be constructed at $\lambda_i$ for i=1, 2, 3. For example, $$M_i(\lambda) = M_i(\lambda_i) + (\lambda - \lambda_i) M_i'(\lambda_i) + \frac{(\lambda - \lambda_i)^2}{2!} M_i''(\lambda) + \ldots \quad (11)$$

For RGB LED illuminants, one may choose $\lambda_1 = \lambda_r$, $\lambda_2 = \lambda_g$, and $\lambda_3 = \lambda_b$.

Therefore, Eq. 10 may be further expressed as (see also Eq. 2):

$$\begin{bmatrix} X \\ Y \\ Z \end{bmatrix} = [M_1(\lambda_1) \; M_2(\lambda_2) \; M_3(\lambda_3)] \begin{bmatrix} R_0 \\ G_0 \\ B_0 \end{bmatrix} + [M_1'(\lambda_1) \; M_2'(\lambda_2) \; M_3'(\lambda_3)] \begin{bmatrix} R_1 \\ G_1 \\ B_1 \end{bmatrix} + \ldots \quad (12)$$

where $R_0$, $G_0$, $B_0$ are the sensed outputs from the red, green and blue color filters, and $R_1$, $G_1$, $B_1$ are the sensed outputs from the edge filters. Further extension of Eq. (12) may lead to the following general structure for X, Y, Z sensing and estimation:

$$\begin{bmatrix} X \\ Y \\ Z \end{bmatrix} = [M_1 \; M_2 \; M_3 \; M_{12} \; M_{13} \; M_{23}] \begin{bmatrix} R_0 \\ G_0 \\ B_0 \\ R_0 G_0 \\ R_0 B_0 \\ G_0 B_0 \end{bmatrix} + [M_1' \; M_2' \; M_3' \; M_{12}' \; M_{13}' \; M_{23}'] \begin{bmatrix} R_1 \\ G_1 \\ B_1 \\ R_1 G_1 \\ R_1 B_1 \\ G_1 B_1 \end{bmatrix} + \ldots \quad (13)$$

Considering that the photodetector outputs from most color filters have a positive responsivity function, the even-order terms in Eq. (10) may sometimes be used without loss.

Figure 5:
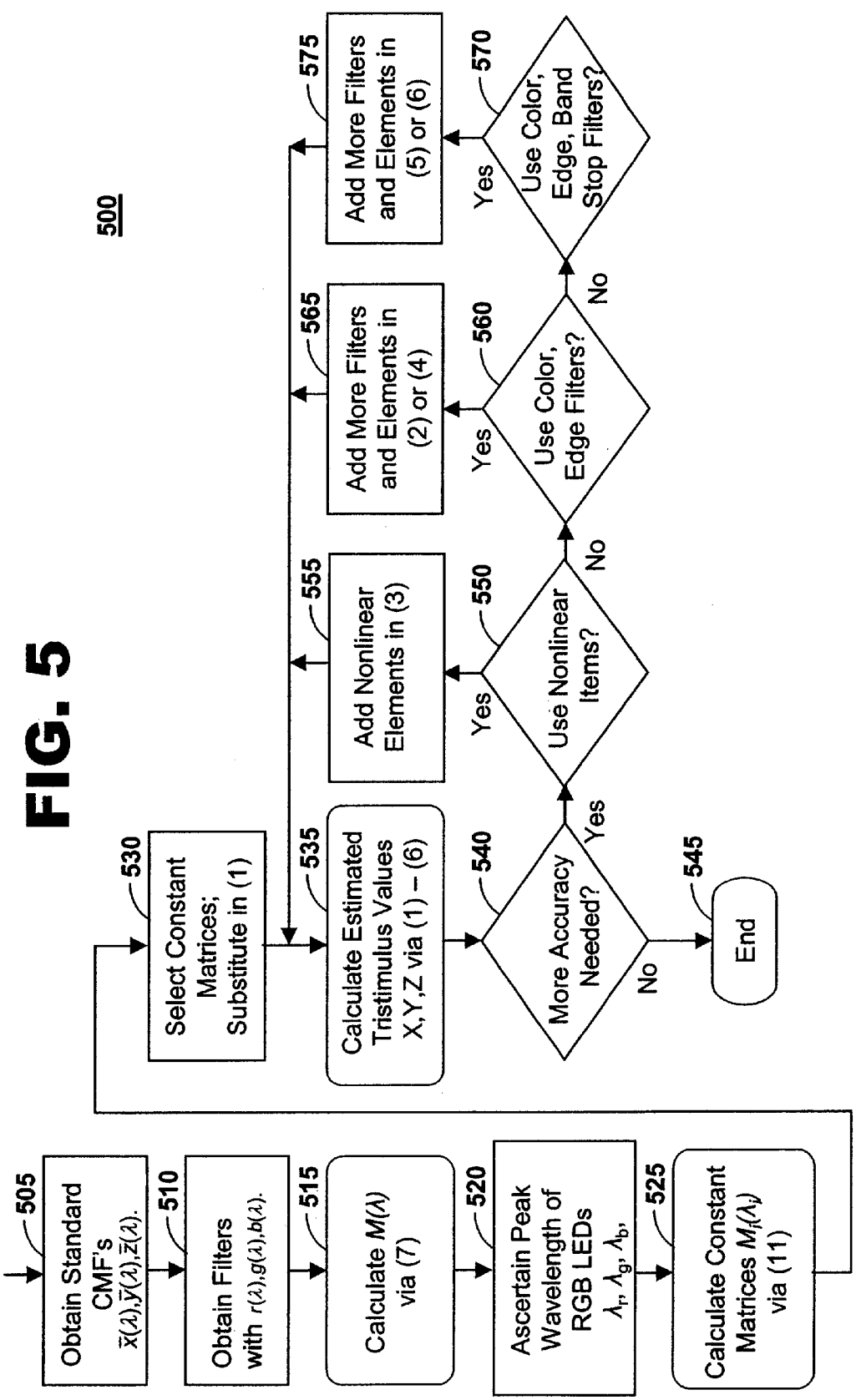
FIG. 5 is a flow diagram of one embodiment of a method for determining tristimulus values for light emitting diode illuminants, in accordance with the current invention.

FIG. 5 shows a flow diagram of a method for determining tristimulus values for light emitting diode illuminants, in accordance with the present invention at 500.

Tristimulus value determination method 500 comprises various steps to estimate the tristimulus values of a red, green and blue LED triad, with increasing levels of accuracy. Tristimulus value determination method 500 may begin by obtaining numerical values of a set of color-matching functions $\bar{x}(\lambda)$, $\bar{y}(\lambda)$, and $\bar{z}(\lambda)$ over a standard range between 380 nm and 780 nm, as seen at block 505. For example, the so-called CIE color-matching functions ($\bar{x}(\lambda)$, $\bar{y}(\lambda)$, $\bar{z}(\lambda)$) defining the color-matching properties of the CIE 1931 standard colorimetric observer widely used in colorimetry may be used. A set of spectral responsivity data or spectral sensitivity functions for the photodetector and color filters may be obtained, as seen at block 510. The spectral sensitivity functions may be obtained from the manufacturer, from data sheets, or may be experimentally measured. The real function matrix M may be calculated according to Eq. 7, as seen at block 515. A set of peak wavelengths associated with the red, green and blue triad may be ascertained from the manufacturer or experimentally obtained, as seen at block 520. Using the set of peak wavelengths, or another set of primary dominant wavelengths, a localized transformation matrix may be calculated according to Eq. 11, as seen at block 525. As seen at block 530, elements of the localized transformation matrix may be selected as in Eq. 1. A set of tristimulus values may be estimated using Eq. 1, as seen at block 535. As seen at block 540, when sufficient accuracy is obtained using a set of responses from the red, green and blue color filters, the estimate may be deemed adequate and the method completed as seen at block 545.

When more accuracy is desired in the determination of tristimulus values for the LED illuminants, cross terms and nonlinear terms associated with the set of responses from the red, green and blue color filters may be used as seen at block 550. The corresponding matrix elements may be selected and used in Eq. 3, as seen at block 555. When even more accuracy is desired, a set of responses from nominally red, green and blue edge filters may be used along with a set of responses from the red, green and blue edge filters as seen at block 560. The set of responses may be combined with associated matrix elements selected and used in Eqs. 2 or 4 as seen at block 565, and the set of tristimulus values estimated, as seen at block 535. When yet still more accuracy is desired, a set of responses from nominally red, green and blue band-stop filters may be used along with responses from the nominally red, green and blue edge filters and responses from the red, green and blue color filters, using corresponding matrix elements from Eqs. 5 or 6, as seen at block 570. The set of responses may be combined with associated matrix elements as seen at block 575, and the set of tristimulus values estimated, as seen at block 535. A further increase in the number of nonlinear terms and cross terms may also be added, when deemed practical.

A set of color point values may be calculated from the estimated tristimulus values, in accordance with the standard conversion equations $$x = \frac{X}{X+Y+Z} \quad (14a)$$

$$y = \frac{Y}{X+Y+Z} \quad (14b)$$

$$z = 1 - x - y \quad (14c)$$

A set of chromaticity coordinates may be calculated from the estimated tristimulus values in the CIE L*a*b* color coordinate system, in accordance with standard conversion equations for the 1976 CIE L*a*b* (CIELAB) color space widely used in the paint, plastic and textile industries. A set of chromaticity coordinates may be calculated from the estimated tristimulus values in the CIE L*u*v* color coordinate system, in accordance with standard conversion equations for the 1976 L*u*v* (CIELUV) color space popular in the television and video display industries.

The set of chromaticity coordinates in the CIE L*a*b* system or the CIE L*u*v* system may be considered device-independent color coordinate systems. Chromaticity coordinates in other device-independent color coordinate systems or pre-defined color coordinate systems may be calculated from the tristimulus values. Other embodiments may include the calculation of chromaticity coordinates in a user-defined color coordinate system, in response to user requirements.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of determining tristimulus values for light emitting diode illuminants comprising:

determining a localized transformation matrix based on a set of spectral sensitivity functions and a set of color-matching functions;

measuring a set of color responses associated with light emitted from the light emitting diode illuminants; and determining an estimate of tristimulus values based on the localized transformation matrix and the set of color responses.

2. The method of claim 1 wherein the light emitting diode illuminants comprise at least one red-green-blue light emitting diode triad.

3. The method of claim 2 wherein the localized transformation matrix is computed using a Taylor's series expansion at a peak red wavelength, a peak green wavelength, and a peak blue wavelength associated with the red-green-blue light emitting diode triad.

4. The method of claim 1 wherein the set of color responses are measured with a red color filter, a green color filter, and a blue color filter.

5. The method of claim 4 wherein the localized transformation matrix comprises matrix elements associated with the color responses from the red, green and blue color filters.

6. The method of claim 1 wherein the set of color responses are measured with a red color filter, a green color filter, a blue color filter, a red edge filter, a green edge filter, and a blue edge filter.

7. The method of claim 6 wherein the localized transformation matrix comprises matrix elements associated with the color responses from the red, green and blue color filters, and the red, green and blue edge filters.

8. The method of claim 1 wherein the set of color responses are measured with a red color filter, a green color filter, a blue color filter, a red edge filter, a green edge filter, a blue edge filter, a red band-stop filter, a green band-stop filter, and a blue band-stop filter.

9. The method of claim 8 wherein the localized transformation matrix comprises matrix elements associated with the color responses from the red, green and blue color filters; the red, green and blue edge filters; and the red, green, and blue band-stop filters.

10. The method of claim 1 further comprising:

calculating a set of color point values from the estimated tristimulus values.

11. The method of claim 1 further comprising:

calculating a set of chromaticity coordinates from the estimated tristimulus values in a color coordinate system selected from a group consisting of a device-independent color coordinate system, a pre-defined color coordinate system, and a user-defined color coordinate system.

12. A light emitting diode illuminant tristimulus value generation system comprising:

means for determining a localized transformation matrix based on a set of spectral sensitivity functions and a set of color-matching functions;

means for measuring a set of color responses associated with light emitted from the light emitting diode illuminants; and means for determining an estimate of tristimulus values based on the localized transformation matrix and the set of color responses.

13. The system of claim 12 further comprising:

means for calculating a set of color point values from the estimated tristimulus values.

14. The system of claim 12 further comprising:

means for calculating a set of chromaticity coordinates from the estimated tristimulus values in a color coordinate system selected from a group consisting of a device-independent color coordinate system, a pre-defined color coordinate system, and a user-defined color coordinate system.

15. A computer usable medium including a program for determining tristimulus values of light emitting diode illuminants comprising:

computer program code to determine a localized transformation matrix based on a set of spectral sensitivity functions and a set of color-matching functions;

computer program code to measure a set of color responses associated with light emitted from the light emitting diode illuminants; and computer program code to determine an estimate of tristimulus values based on the localized transformation matrix and the set of color responses.

16. The computer usable medium of claim 15 wherein the localized transformation matrix comprises matrix elements associated with the color responses from a set of red, green and blue color filters.

17. The computer usable medium of claim 15 wherein the localized transformation matrix comprises matrix elements associated with the color responses from a set of red, green and blue color filters, and a set of red, green and blue edge filters.

18. The computer usable medium of claim 15 wherein the localized transformation matrix comprises matrix elements associated with the color responses from a set of red, green and blue color filters; a set of red, green and blue edge filters; and a set of red, green, and blue band-stop filters.

19. The computer usable medium of claim 15 further comprising:

computer program code to calculate a set of color point values from the estimated tristimulus values.

20. The computer usable medium of claim 15 further comprising:

computer program code to calculate a set of chromaticity coordinates from the estimated tristimulus values in a color coordinate system selected from a group consisting of a device-independent color coordinate system, a pre-defined color coordinate system, and a user-defined color coordinate system.

* * * * *